United States Patent
El-Khamy et al.

(10) Patent No.: US 11,948,280 B2
(45) Date of Patent: Apr. 2, 2024

(54) SYSTEM AND METHOD FOR MULTI-FRAME CONTEXTUAL ATTENTION FOR MULTI-FRAME IMAGE AND VIDEO PROCESSING USING DEEP NEURAL NETWORKS

(71) Applicant: Samsung Electronics Co., Ltd., Gyeonggi-do (KR)

(72) Inventors: Mostafa El-Khamy, San Diego, CA (US); Ryan Szeto, Ann Arbor, MI (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 361 days.

(21) Appl. No.: 16/860,754

(22) Filed: Apr. 28, 2020

(65) Prior Publication Data
US 2021/0217145 A1    Jul. 15, 2021

Related U.S. Application Data

(60) Provisional application No. 62/960,867, filed on Jan. 14, 2020.

(51) Int. Cl.
| | | |
|---|---|---|
| *G06K 9/00* | (2022.01) | |
| *G06T 5/00* | (2006.01) | |
| *G06T 5/50* | (2006.01) | |
| *G06T 7/246* | (2017.01) | |

(52) U.S. Cl.
CPC ............ *G06T 5/005* (2013.01); *G06T 5/50* (2013.01); *G06T 7/246* (2017.01); *G06T 2207/10016* (2013.01); *G06T 2207/20084* (2013.01); *G06T 2207/20182* (2013.01)

(58) Field of Classification Search
CPC .......... G06T 5/005; G06T 5/50; G06T 7/246; G06T 2207/10016; G06T 2207/20084; G06T 2207/20182; G06T 7/20; G06K 9/00711; G06N 3/08; G06V 20/40
See application file for complete search history.

(56) References Cited

U.S. PATENT DOCUMENTS

| | | | |
|---|---|---|---|
| 2008/0238942 A1 | 10/2008 | Sun et al. | |
| 2010/0177978 A1 | 7/2010 | Jeong et al. | |
| 2015/0054970 A1* | 2/2015 | Hamada | G06T 5/002 348/208.1 |
| 2015/0364158 A1* | 12/2015 | Gupte | H04N 5/144 386/223 |
| 2017/0011494 A1 | 1/2017 | Ahn et al. | |

(Continued)

OTHER PUBLICATIONS

Szeto, R., et al. "A Temporally-Aware Interpolation Network for Video Frame Inpainting." IEEE Transactions on Pattern Analysis and Machine Intelligence. (Year: 2018).*

(Continued)

*Primary Examiner* — Andrew M Moyer
(74) *Attorney, Agent, or Firm* — The Farrell Law Firm, P.C.

(57) ABSTRACT

A method and system for multi-frame contextual attention are provided. The method includes obtaining a reference frame to be processed, identifying context frames with respect to the reference frame, and producing a refined reference frame by processing the obtained reference frame based on the context frames.

14 Claims, 5 Drawing Sheets

(56) References Cited

U.S. PATENT DOCUMENTS

2018/0165798 A1 6/2018 Lin et al.
2018/0324465 A1* 11/2018 Aydin ............... H04N 19/80

OTHER PUBLICATIONS

Chang, Ya-Liang, Zhe Yu Liu, and Winston Hsu. "VORNet: Spatio-Temporally Consistent Video Inpainting for Object Removal." 2019 IEEE/CVF Conference on Computer Vision and Pattern Recognition Workshops (CVPRW). IEEE. (Year: 2019).*
Xu, Rui, et al. "Deep flow-guided video inpainting." Proceedings of the IEEE/CVF Conference on Computer Vision and Pattern Recognition. (Year: 2019).*
Liu, Hongyu, et al. "Coherent semantic attention for image inpainting." Proceedings of the IEEE/CVF International Conference on Computer Vision. 2019. (Year: 2019).*
Woo, Sanghyun, et al. "Align-and-attend network for globally and locally coherent video inpainting." arXiv preprint arXiv:1905.13066 (2019). (Year: 2019).*
Pathak, Deepak et al., "Context Encoders: Feature Learning by Inpainting", arXiv:1604.07379v2 [cs.CV] Nov. 21, 2016, pp. 12.
Kim, Dahun et al., "Deep Video Inpainting", arXiv:1905.01639v1 [cs.CV] May 5, 2019, pp. 10.
Yu, Jiahui et al., "Generative Image Inpainting with Contextual Attention", arXiv:1801.07892v2 [cs.CV] Mar. 21, 2018, pp. 15.
Yang, Chao et al., "High-Resolution Image Inpainting using Multi-Scale Neural Patch Synthesis", arXiv:1611.09969v2 [cs.CV] Apr. 13, 2017, pp. 9.
Liu, Guilin et al., "Image Inpainting for Irregular Holes Using Partial Convolutions", arXiv:1804.07723v2 [cs.CV] Dec. 15, 2018, pp. 23.
Lai, Wei-Sheng et al., "Learning Blind Video Temporal Consistency", arXiv:1808.00449v1 [cs.CV] Aug. 1, 2018, pp. 16.

* cited by examiner

SYSTEM AND METHOD FOR MULTI-FRAME CONTEXTUAL ATTENTION FOR MULTI-FRAME IMAGE AND VIDEO PROCESSING USING DEEP NEURAL NETWORKS

PRIORITY

This application is based on and claims priority under 35 U.S.C. § 119(e) to U.S. Provisional Patent Application filed on Jan. 14, 2020 in the United States Patent and Trademark Office and assigned Ser. No. 62/960,867, the entire contents of which are incorporated herein by reference.

FIELD

The present disclosure is generally related to multi-frame contextual attention for multi-frame images. In particular, the present disclosure is related to a system and method for imaging inpainting and video inpainting.

BACKGROUND

Image inpainting involves the removal of selected areas in an image and filling these holes such that they blend in with the rest of the image. Video inpainting is a procedure for a sequence of frames in a video, where a specific object is removed from subsequent frames, and then the holes in the subsequent frames are filled such that they blend with the rest of the image.

SUMMARY

In one embodiment, a method for multi-frame contextual attention includes obtaining a reference frame to be processed, identifying context frames with respect to the reference frame, and producing a refined reference frame by processing the obtained reference frame based on the context frames.

In one embodiment, a system for multi-frame contextual attention includes a memory and a processor configured to obtain a reference frame to be processed, identify context frames with respect to the reference frame, and produce a refined reference frame by processing the obtained reference frame based on the context frames.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
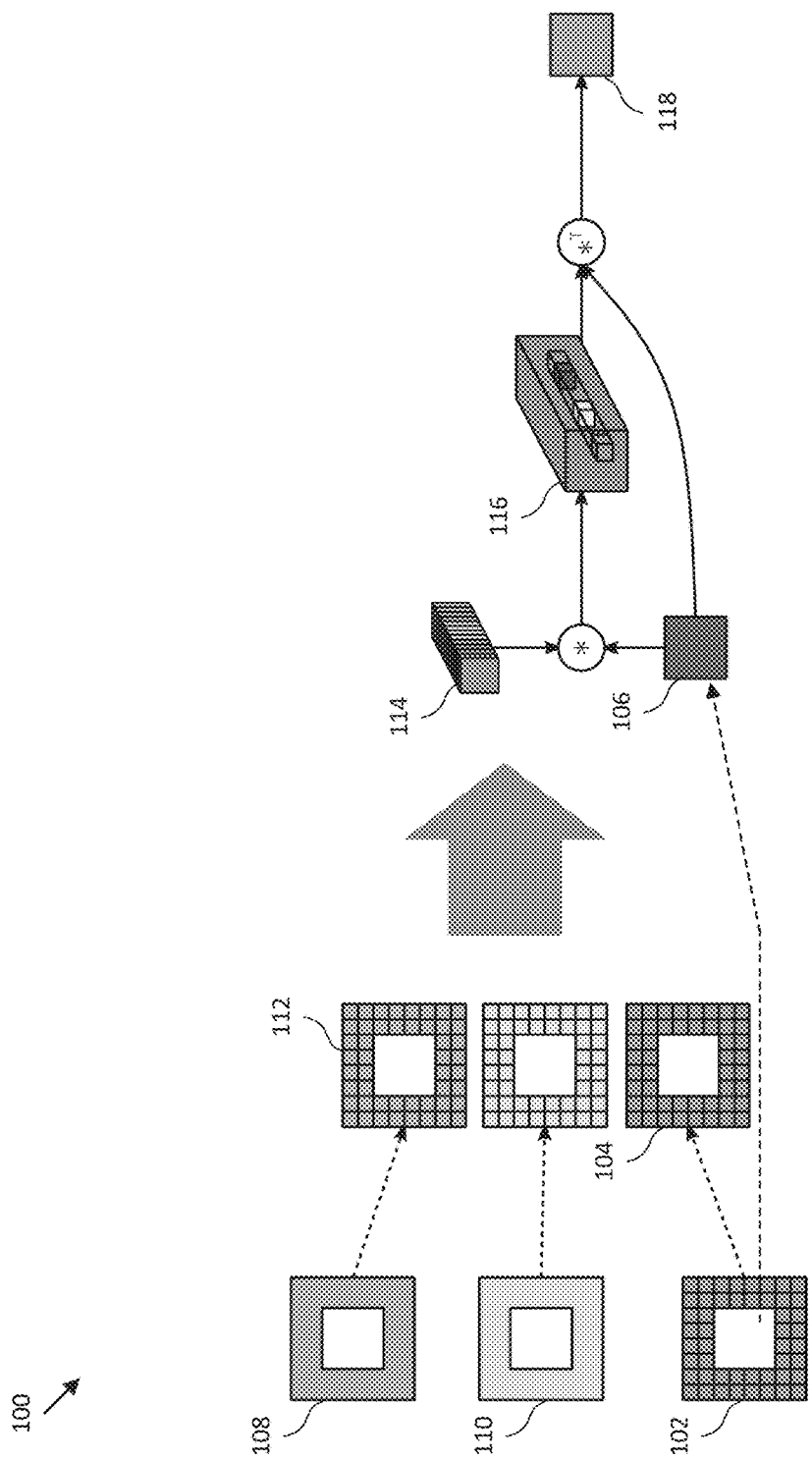
FIG. 1 illustrates a diagram of a multi-frame contextual attention module, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method provide an architecture for inpainting videos while constraining the temporal consistency between inpainted features. The present system and method utilize a neural network architecture to directly search the neighboring frames for the patches that provide the best fit in the missing holes from the current frame, and then fills the holes using a function of the patches that provide the best fit. Since the holes in each frame are filled by looking at the neighboring frames and borrowing information from them, the present system and method provides inpainted videos with temporal consistency.

The present system and method may be utilized in multi-frame image enhancement. For example, in multi-frame denoising, it is desired to provide a denoised frame, where the noise can be Poisson noise or Gaussian noise, or other undesired artifacts such as low-light artifacts, speckles, or ghosting, effects. Furthermore, in multi-frame super-resolution, a larger resolution frame is obtained from a smaller resolution frame using information from the neighboring frames. In the above embodiments (i.e., inpainting, enhancement, and super-resolution), the multi-frame contextual attention module can find the most appropriate patch from the neighboring frames to enhance the target frame.

The present system and method leverages the information from neighboring frames when filling holes in target frame, extracts un-occluded patches from neighboring frames to gain information about occluded patches in current frame that may be occluded by an undesired foreground object such that the undesired object is removed, and generates aesthetically pleasant synthesized videos with more temporal consistency, and without additional post processing.

The application of video inpainting as an example of multi-frame processing, where it can be done by sequential sliding windows of multi-frame to single-frame inpainting, is considered. On the other hand, image inpainting is an example of single frame processing. It is the task of replacing spatial holes (sets of missing pixels) in an image with realistic values. The primary consumer applications are watermark removal and object removal. Another application is the removal of unwanted objects that appear in the image when taking a picture or a snapshot. Video inpainting is an example of a multi-frame technique that aims to fill spatial-temporal holes in a video with realistic or plausible contents. Compared to image inpainting, the additional time dimension makes it challenging, as the information filled in one frame should be consistent with those filled in the neighboring frames. This becomes particularly challenging when there is significant motion between frames.

Image inpainting reconstructs features in the occluded region (the "foreground") by borrowing patches of features in the unoccluded region (the "background") in the same image. However, in occluded cases, with movement, the foreground object that is desired to be removed can be occluding the specific region in one frame, but not necessarily in the next frame. By looking ahead at the next frame, and looking backward at the previous frame, one can find the region that best matches the holes (after removing undesired objects) in the current frame.

In the present system and method, the background patches need not come from the input image to be inpainted (i.e., they can also come from "context" images whose content is similar to that of the desired inpainted region, such as stock images used as reference images). For example, to inpaint a desired frame in a video sequence (the "reference" frame), unoccluded patches may be extracted from the frames immediately before and after it. This can be useful, for instance, in cases where the foreground object is occluding a part of the scene that is visible in nearby frames.

To this end, the present system and method provides a multi-frame contextual attention module that reconstructs features using not just the current reference frame, but also multiple context frames. This module can be inserted in many popular deep convolutional neural networks. A component of the model (i.e., MF-Cxtattn) is the multi-frame contextual attention module which extracts background patches from both the reference frame and the context frames.

Feature maps corresponding to the current frame, and feature maps corresponding to the neighboring frames at a certain depth in the network are selected. The non-masked regions in the feature maps are selected. The non-masked regions are defined as regions in the feature maps that are derived from regions in the corresponding input frames that are not desired to be removed (masked) in these frames. The non-masked regions in the feature maps corresponding to the multiple frames are then divided into patches of fixed size using a uniform grid. For example, the patches can be of size 3×3. If the feature maps have a dimension width× height×depth, then the patches will have size 3×3×depth treating the whole feature as a 3 dimensional filter, and borrowing the 3 dimensional filter at once.

In another embodiment, each 2 dimensional slice of the feature is treated independently, and only a 2D patch in the feature is borrowed at once. In this case, the patches will be of size of 3×3 or M×N. If part of the M×N×depth patch corresponds to a masked region, then it is filled will invalid entries (such as alpha or 0) that are ignored during the processing. Next, all the grid patches are stacked together in a 4-dimensional array (e.g. M×N×depth×number-of-patches). This array is treated as a 4-dimensional filter of size of M×N×depth×number_of_patches.

This filter is convoluted with a coarse estimate (or a noisy estimate in case of denoising or image enhancement or image super-resolution) of the regions in the 3-dimensional features corresponding to target frame that needs to be filled or enhanced.

Each of the M×N×depth component filters is element-wise multiplied by another M×N×depth feature corresponding to the desired processing region in the target frame. Then, the sum of this element-wise values is taken to produce the convolutional output. The operation is repeated at each desired patch, which can just be sliding across the image with a desired stride. In case of stride 1, then all possible locations are covered. The convolutional output at each location is normalized by a non-linear function such as the SoftMax to provide the attention-score at this location. Hence, the attention represents the correlation between the current patch in the deep feature map of target frame at the desired region to be processed and the patches from the deep feature maps from the current frame (surrounding the desired processing patch and is non-occluded) as well as from the neighboring frames.

The target processing patch in the deep feature map is then replaced with another patch sum (attention-score_{patch, frame}*{patch, frame}) which is the weighted sum of the M×N×depth patches, and the weights are determined by their attention score.

Alternatively, the sum can be limited to the top patches only. The system may sort the patches according to their attention. The system may pick the top T patches with the largest attention scores. If sum_T is the sum limited to the top_T patches, then the patch in the deep feature map is replaced by sum_T(attention-score_{patch, frame}*{patch, frame}).

This module can be inserted at any desired layer in the deep convolutional networks, or at multiple layers to enforce the temporal consistency at multiple deep layers in the network.

The network is trained end to end. It can be trained with reconstruction loss only, such as to optimize the peak signal to noise ratio (PSNR) or the structural similarity (SSIM) to the ground truth, or a combination of reconstruction and generative adversarial losses using Wasserstein generative adversarial network (GANs) training, which minimizes the Wasserstein-1 distance between the generated (fake) and real distribution. Alternatively, they can be trained using a min-max GAN training. A combination of the reconstruction losses and min-max GAN adversarial loss may be utilized, where the discriminator used spectral normalization layers that limits their outputs to scalars in (0,1).

FIG. 1 illustrates a diagram of a multi-frame contextual attention module, according to an embodiment. The module 100 includes a reference frame 102 having a foreground 104 and a background 106, as well as a first context frame 108 and a second context frame 110. The first and second context frames 108 and 110 may be considered neighboring frames to the reference frame 102. Deep features derived from the neighboring context frames 108 and 110 are extracted from the valid regions, and segmented into uniform 3D blocks by a uniform grid as shown by the background patches 112. Each 3D block makes a 3D filter. All 3D filters are stacked at 114 to make a 4D filter that is convoluted with the target region of interest 104 in the reference frame 102. The attention scores of each filter are calculated at each valid position in the target region of interest at 116. The patch at each location in the desired target region is then replaced by a function (e.g. weighted sum) of the 3D filters and their attention scores at this location to produce a reconstructed patch 118.

Figure 2:
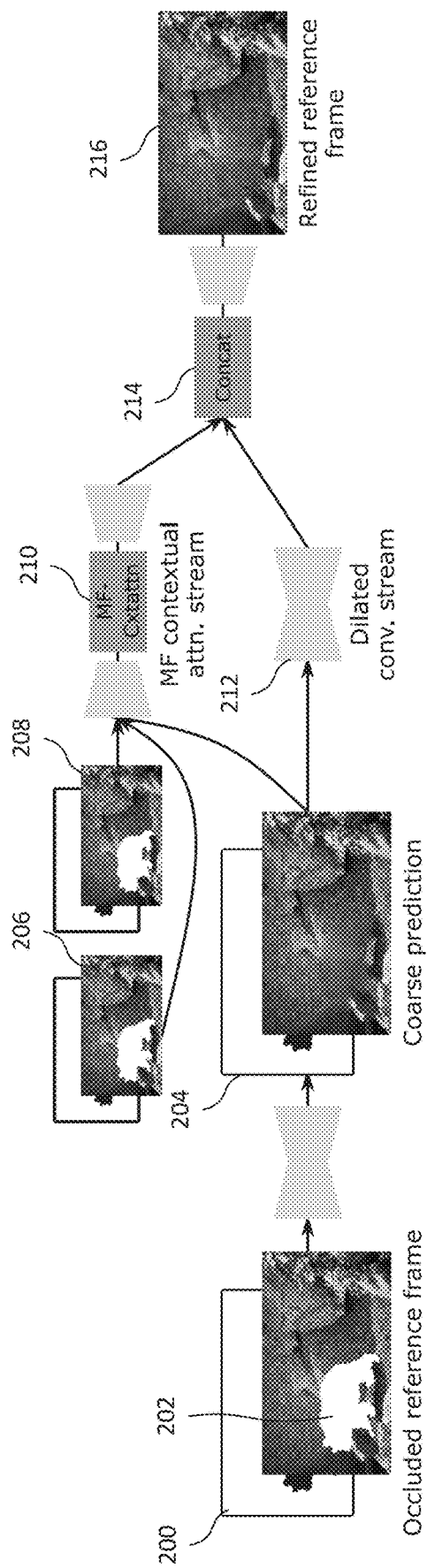
FIG. 2 illustrates a diagram of a deep convolutional neural network with multi-frame inpainting using a multi-frame contextual attention module, according to an embodiment.

FIG. 2 illustrates a diagram of a deep convolutional neural network with multi-frame inpainting using a multi-frame contextual attention module, according to an embodiment. FIG. 2 shows an example when first coarse prediction is run to fill the holes, using some convolutional filtering, and the multi-frame contextual attention is applied using the deep features from this frame and the neighboring context frames, and concatenated with a filtered version of the coarse prediction before being provided to the decoder that combines both predictions and refines them.

Referring to FIG. 2, an occluded reference frame 200 is obtained. The reference frame includes an occlusion as an object 202 (e.g., as a bear in the embodiment shown). The system performs a coarse prediction 204 to fill the holes from the object 202 based on conventional filtering. The system processes the coarse prediction 204 with occluded context (neighboring) frames 206 and 208 through a multi-frame contextual attention stream 210. The system also processes the coarse prediction 206 through a dilated convolutional stream 212. The system processes the outputs of the attention stream 210 and the stream 212 into a concatenation function 214 to produce the refined reference frame 216.

The choice of the neighboring context frames is a parameter that can be optimized differently for different videos. The system may detect an amount of motion in a video. Videos in which a lot of motion is detected, where the motion is fast as compared to the frame rate, may need to consider only the left and right frames (i.e., 3 frames) in total because the scene may change a lot in farther away frames. Consequently, borrowing from farther away frames may even hurt the performance.

If the occlusion takes more frames to clear, or the scene change is relatively low, it may be beneficial to borrow information from more than one frame left and right. For example, contextual attention can be done on a window of 5 frames or 7 frames.

Different embodiments may insert the multi-frame contextual attention layer at different network depths. It can be moved upstream work on the shallower features, or moved downstream to work on the deeper features. Alternatively, there can be more than one multi-frame contextual attention layer.

Figure 3:
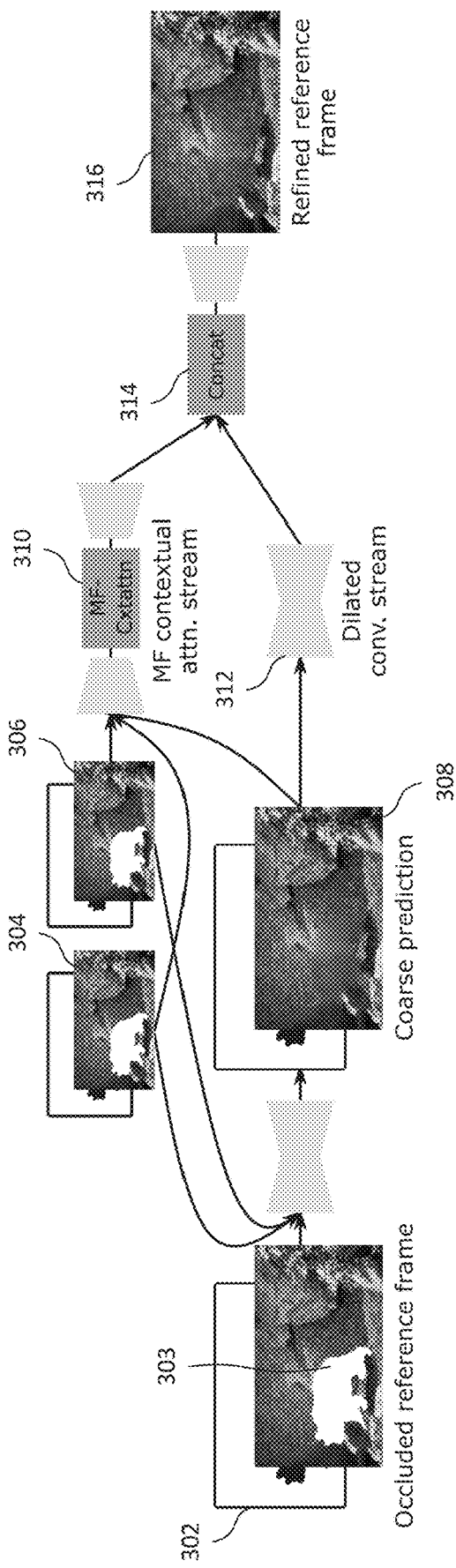
FIG. 3 illustrates a diagram of a multi-frame contextual information when making the coarse prediction of the current frame, according to an embodiment.

FIG. 3 illustrates a diagram of a multi-frame contextual information when making the coarse prediction of the current frame, according to an embodiment. In the multi-frame to image inpainting context in FIG. 3, the system limits the deep feature patch extraction to be from the valid or non-masked neighboring raw frames and from the non-masked patches in the raw frames only.

The system obtains an occluded reference frame 302 with a removed object 303 occluding the image and occluded context frames 304 and 306. The system processes the occluded reference frame 302 and the occluded context frames 304 and 306 to produce a coarse prediction 308 through conventional filtering. Then, similarly to FIG. 2, the system processes the occluded context frames 304 and 306 with the coarse prediction through a multi-frame contextual attentional stream 310. The system processes the coarse prediction 308 through a dilated convolutional stream 312. The system processes the outputs of the attention stream 310 and the convolutional stream 312 with a concatenation function 314 to produce a refined reference frame 316.

Figure 4:
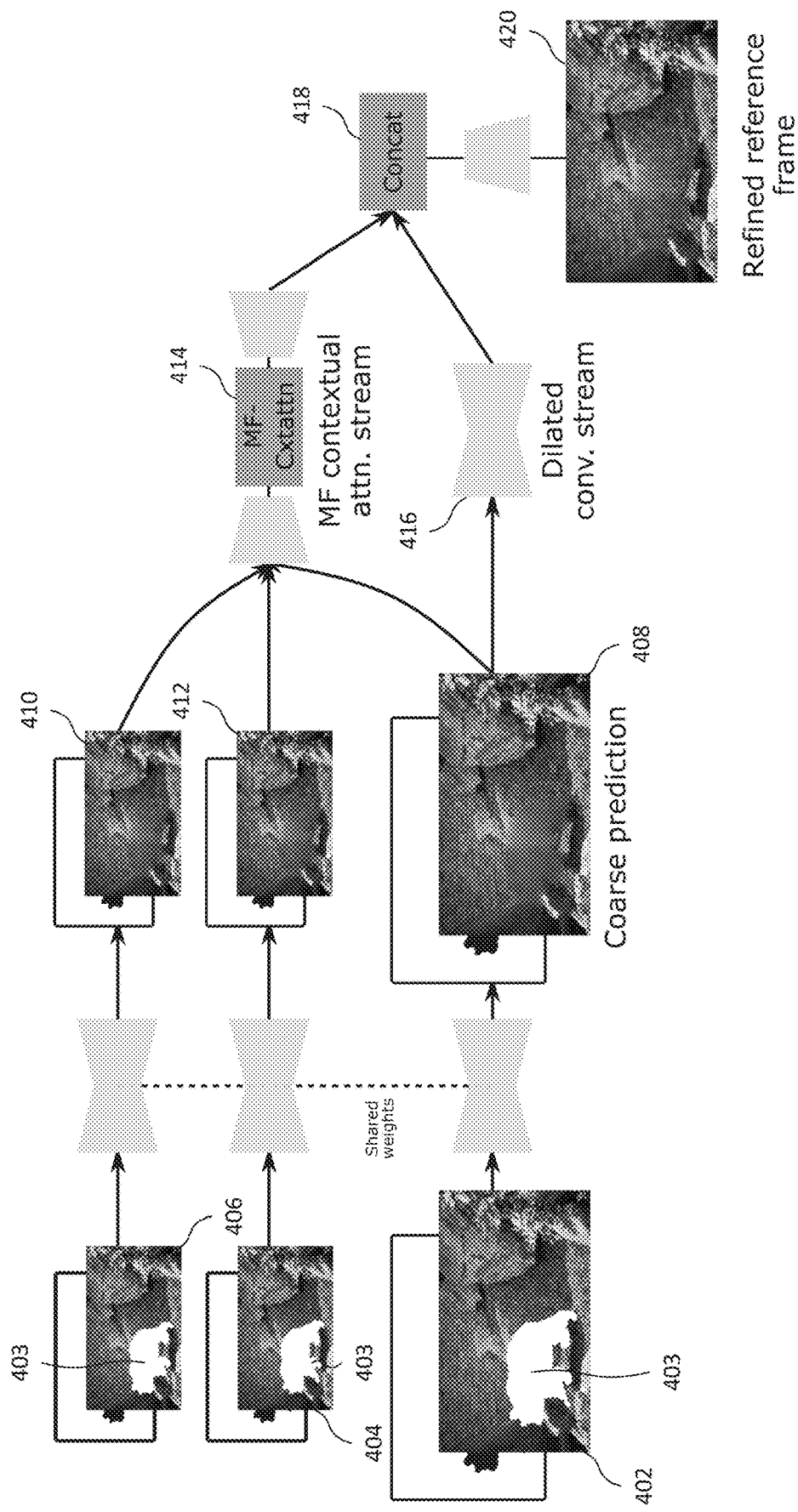
FIG. 4 illustrates a diagram of multi-frame contextual attention being performed recursively, according to an embodiment.

FIG. 4 illustrates a diagram of multi-frame contextual attention being performed recursively, according to an embodiment. The multi-frame contextual attention borrows information from coarse processed frames or from already processed frames using the sequential processing approach. Having a better prediction of neighboring frames based on temporal contextual information will always improve the prediction of the current target frame. Since the prediction of current frame is based on prediction of neighboring frames done with temporal contextual attention, after processing all frames, the process can be repeated again, by considering the coarse estimates to be those estimated from the previous temporal contextual attention step In FIG. 4, the system obtains an occluded reference frame 402 and occluded context frames 404 and 406, each with a removed object 403. The system processes the occluded reference frame 402 through conventional filtering to produce a coarse prediction 408 of the reference frame 402. The system processes the occluded context frames 404 and 406 to produce coarse predictions 410 and 412 of the context frames 404 and 406, respectively. The system processes the coarse predictions 408, 410 and 412 through a multi-frame contextual attention stream 414 and the coarse prediction 408 through a dilated convolutional stream 416. The system processes the outputs of the attention stream 414 and the convolutional stream 416 through a concatenation function 418 to produces a refined reference frame 420.

Another solution is to make use of the sequential processing of the video sequence in a sliding window fashion. Since the processing is done in a sliding window fashion, when processing for target frame t, target frame t−1 may have already been processed. For example, any occlusion in frame t−1 may have been filled already by processing frame t−1, hence increasing the number of valid patches that can be borrowed from frame t−1. Similarly, for a frame denoising case, if frame t−1 is already denoised, the system can get a better processing for frame t by borrowing better denoised contextual patches form frame t−1.

Hence, another example is to construct the contextual filters from all patches in features from the fully processed previous frames. However, only the valid patches in the features of the current and future raw frames can be used. Since the previous frames have already been processed (e.g., inpainted or denoised), the processing for the current frame will attempt to find the patch with the best match and give it a corresponding attention score from the processed previous frame rather than from the raw previous frame. Hence, the target processed frame can have better temporal consistency with the previously processed frame.

The above embodiments for multi-frame processing can also be applied for multi-frame to single-frame processing, where a burst of images are captured every time the user presses the shutter button or open the preview screen. The captured burst of images represent the multiple frames that will be processed. The target frame can be the image at the center of the burst, or the end. The variations in the sequential images burst can still be useful due to variations in image exposures which can be programmed or variations in actual camera pose due to shaking of the camera, which is the case with hand-held mobile phones.

In multi-frame denoising, information from multiple frames is used to denoise the target frame. Each patch in the target frame is a valid patch for processing. Each patch in the target frame is also a valid patch to be used as contextual information to denoise other patches in the same frame or neighboring frames.

Feature maps from the target frame and from the neighboring contextual frames are extracted. With a patch to be denoised in the target frame, (e.g., a 3×3 block of pixels), the corresponding patch in the feature maps be called the target patch and mask it such that only this patch is masked. The masked area will then correspond to the target patch only. The system constructs the contextual convolutional filters from the corresponding unmasked areas in the feature maps of the target frame and the neighboring frames. The contextual convolutional filters are obtained by partitioning the unmasked areas (all areas except the target patch) in the target frame and the neighboring contextual frames into filters of the same size as the target patch. The individual contextual filters are stacked together to make the concatenated contextual convolutional filter, where each individual contextual filter is correlated with the target patch by using the dot product, to calculate the attention score. A contextual patch is calculated as the linear combination of the individual contextual filters, where the weights for the contextual patches correspond to the calculated attention scores. The contextual patch is then combined with the target patch using the short-cut connection. The process is repeated by sliding the mask (for the denoised patch) across all the locations in the image at the second step, till all the image is covered.

Figure 5:
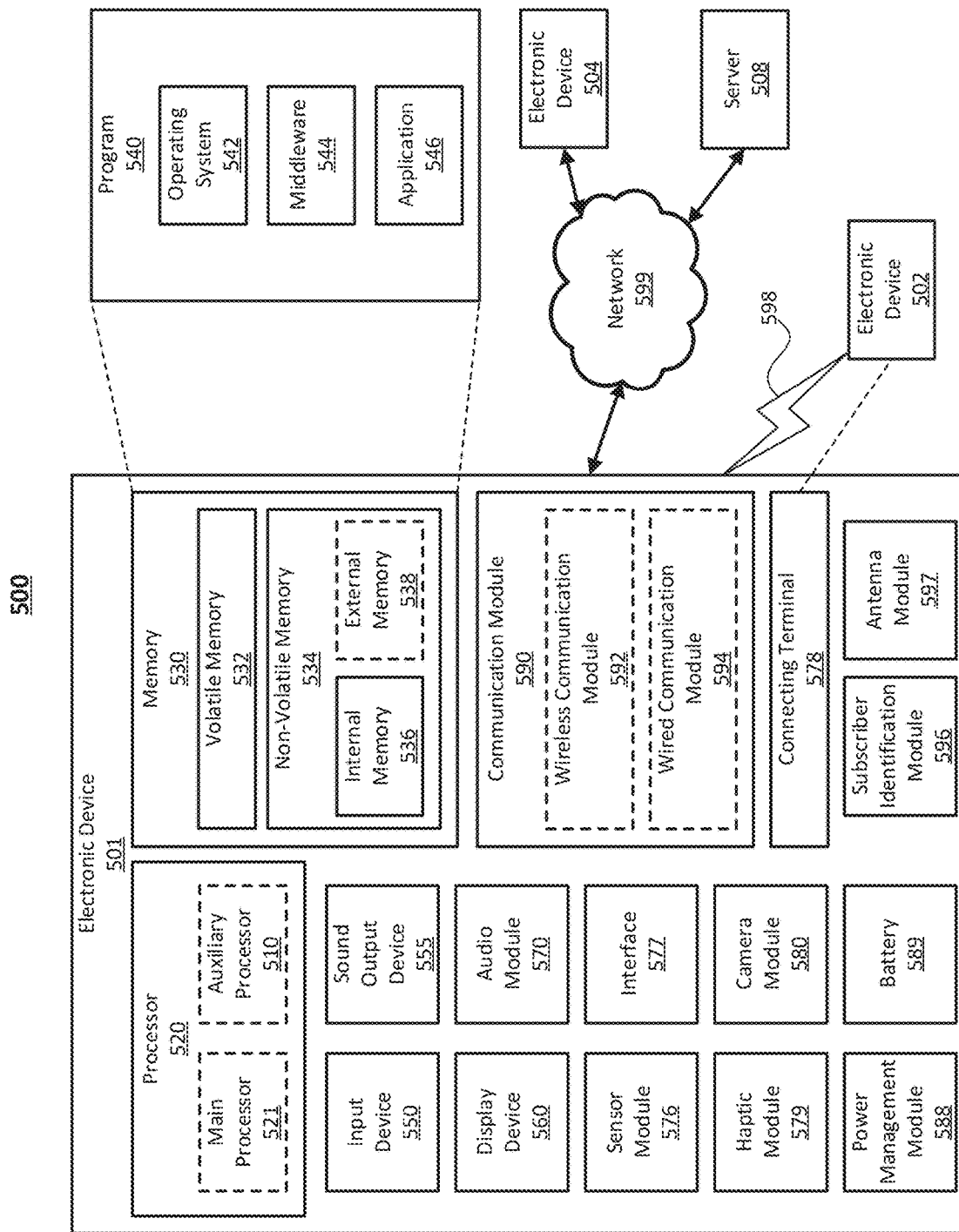
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with another electronic device 502 via a first network 598 (e.g., a short-range wireless communication network), or another electronic device 504 or a server 508 via a second network 599 (e.g., a long-range wireless communication network). The electronic device 501 may also communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an ISP or a CP) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, ISPs, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more CPs that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for multi-frame contextual attention, the method comprising:
    obtaining a reference frame from a video, the reference frame having an occluded region;
    identifying context frames from the video with respect to the reference frame, the context frames comprising a first set of one or more consecutive neighboring frames immediately prior to the reference frame and a second set of one or more consecutive neighboring frames immediately subsequent to the reference frame, wherein a first number of frames in the first set is equal to a second number of frames in the second set, and the first number and the second number have an inversely proportional relationship to a scene changing speed in the video;
    producing a coarse prediction of the reference frame using at least the reference frame to fill a hole of the occluded region based on filtering; and
    producing a refined reference frame by processing the coarse prediction of the reference frame and the context frames.

2. The method of claim 1, wherein producing the refined reference frame further includes producing a coarse prediction of each context frame based on convolutional filtering.

3. The method of claim 2, wherein producing the refined reference frame further includes processing the coarse predictions of each context frame and the coarse prediction of the reference frame in a multi-frame contextual attention stream.

4. The method of claim 1, wherein producing the refined reference frame further includes processing the coarse prediction of the reference frame and the identified context frames in a multi-frame contextual attention stream.

5. The method of claim 1, wherein the identified context frames include non-masked regions in feature maps corresponding to multiple frames.

6. The method of claim 1, further comprising detecting the amount of motion in the video.

7. The method of claim 1, wherein the reference frame is occluded by an object, and further comprising:
removing the object producing the hole in the reference frame,
wherein processing the coarse prediction of the reference frame and the context frames includes filling the hole in the obtained reference frame.

8. A system for multi-frame contextual attention, the system comprising:
a memory; and
a processor configured to:
obtain a reference frame from a video, the reference frame having an occluded region;
identify context frames from the video with respect to the reference frame, the context frames comprising a first set of one or more consecutive neighboring frames immediately prior to the reference frame and a second set of one or more consecutive neighboring frames immediately subsequent to the reference frame, wherein a first number of frames in the first set is equal to a second number of frames in the second set, and the first number and the second number have an inversely proportional relationship to a scene changing speed in the video; and
produce a coarse prediction of the reference frame using at least the reference frame to fill a hole of the occluded region through filtering;
produce a refined reference frame by processing the coarse prediction of the reference frame and the context frames.

9. The system of claim 8, wherein producing the refined reference frame further includes producing a coarse prediction of each context frame based on convolutional filtering.

10. The system of claim 9, wherein the processor is further configured to produce the refined reference frame by processing the coarse predictions of each context frame and the coarse prediction of the reference frame in a multi-frame contextual attention stream.

11. The system of claim 8, wherein the processor is further configured to produce the refined reference frame by processing the coarse prediction of the reference frame and the identified context frames in a multi-frame contextual attention stream.

12. The system of claim 8, wherein the identified context frames include non-masked regions in feature maps corresponding to multiple frames.

13. The system of claim 8, wherein the processor is further configured to detect the amount of motion in the video.

14. The system of claim 8, wherein the reference frame is occluded by an object, and
wherein the processor is further configured to remove the object producing a hole in the reference frame, and processing the coarse prediction of the reference frame and the context frames includes filling the hole in the obtained reference frame.

* * * * *